(12) United States Patent
Müller

(10) Patent No.: US 9,423,296 B2
(45) Date of Patent: Aug. 23, 2016

(54) UNIT FOR DETERMINING THE TYPE OF A DOMINATING LIGHT SOURCE BY MEANS OF TWO PHOTODIODES

(75) Inventor: Christian Müller, Deuerling (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 340 days.

(21) Appl. No.: 14/007,962

(22) PCT Filed: Mar. 29, 2011

(86) PCT No.: PCT/EP2011/054791
§ 371 (c)(1),
(2), (4) Date: Dec. 2, 2013

(87) PCT Pub. No.: WO2012/130280
PCT Pub. Date: Oct. 4, 2012

(65) Prior Publication Data
US 2014/0077070 A1   Mar. 20, 2014

(51) Int. Cl.
*G01J 1/42* (2006.01)
*G01J 3/36* (2006.01)
*G01J 3/427* (2006.01)
*G01J 3/02* (2006.01)

(52) U.S. Cl.
CPC .............. *G01J 1/4228* (2013.01); *G01J 3/0264* (2013.01); *G01J 3/36* (2013.01); *G01J 3/427* (2013.01)

(58) Field of Classification Search
CPC ......... G01J 1/4228; G01J 3/0264; G01J 3/36; G01J 3/427
See application file for complete search history.

(56) References Cited

U.S. PATENT DOCUMENTS

| 3,452,205 | A | 6/1969 | Bogholtz et al. |
| 4,079,388 | A | 3/1978 | Takahama et al. |
| 4,309,604 | A | 1/1982 | Yoshikawa et al. |
| 5,621,494 | A | 4/1997 | Kazumi et al. |
| 8,592,744 | B2 * | 11/2013 | Van Dalen ............ G01J 1/4204 250/214 AL |

(Continued)

FOREIGN PATENT DOCUMENTS

| CN | 101535785 A | 9/2009 |
| CN | 101779109 A | 7/2010 |
| DE | 3231025 A1 | 2/1984 |

(Continued)

*Primary Examiner* — Francis M Legasse, Jr.
(74) *Attorney, Agent, or Firm* — McDermott Will & Emery LLP

(57) ABSTRACT

The invention relates to a unit (1) for determining the dominant light source type in electromagnetic radiation (2) incident on the unit (1) and generated from a plurality of light sources of different types. The unit comprises at least one first photodiode (10) designed to detect electromagnetic radiation in the visible spectral range and to generate a first output signal (11). The unit comprises at least one second photodiode (20) designed to detect electromagnetic radiation in the infrared spectral range and to generate a second output signal (21). The unit comprises at least one calculation unit (30) designed to derive a quotient result (23) and a frequency result (13) from the first (11) and second (21) output signals. The frequency result (13) provides information about the presence or absence of signal components in a predetermined frequency range contained in the electromagnetic radiation. The unit comprises at least one evaluation unit (40) designed to derive the dominant light source type from the quotient result (23) and the frequency result (13).

20 Claims, 6 Drawing Sheets

(56) References Cited

U.S. PATENT DOCUMENTS

2003/0222208 A1 12/2003 Guenter et al.
2008/0191298 A1* 8/2008 Lin ..................... G01J 1/4204
　　　　　　　　　　　　　　　　　　　　　257/432

FOREIGN PATENT DOCUMENTS

| | | |
|---|---|---|
| DE | 69201104 T2 | 7/1995 |
| DE | 102004028273 A1 | 2/2005 |
| DE | 102008016167 A1 | 10/2008 |
| DE | 102008051907 A1 | 5/2009 |
| EP | 2284496 A1 | 2/2011 |
| GB | 2077533 A | 12/1981 |
| JP | 58053327 A | 3/1983 |
| JP | 60114727 A | 6/1985 |
| JP | 07120806 A | 5/1995 |
| WO | 2009/013725 A1 | 1/2009 |

* cited by examiner

| Light source | Constant component of first output signal (ALS) | Constant component of second output signal (IR) | Quotient result (IR/ALS) | Frequency result |
|---|---|---|---|---|
| Sunlight | high | low | low | 0 Hz |
| Incandescent lamp | low | high | high | 50/60 Hz |
| Torch | low | high | high | 0 Hz |
| Fluorescent lamp | high | low | very low | 50/60 Hz |
| White LED, pulsed | high | low | very low | ~ kHz, e.g. 300 kHz |
| White LED, DC | high | low | very low | 0 Hz |

FIG 5

| Quotient result (23) / Frequency result (13) | high | low | very low |
|---|---|---|---|
| ~ kHz e.g. 300 kHz | | | white LED, pulsed |
| 50/60 Hz | incandescent lamp | | fluorescent lamp |
| 0 Hz | torch | sunlight | white LED, DC |

FIG 6

UNIT FOR DETERMINING THE TYPE OF A DOMINATING LIGHT SOURCE BY MEANS OF TWO PHOTODIODES

The present invention relates to a sensor for determining the dominant light source type from a plurality of light sources of different types. A measurement method is also provided.

Sensors, in particular colour sensors, which perform a complete spectral analysis are known from the prior art.

A problem associated with these sensors is that they are complex and thus expensive to produce.

This problem is solved by a sensor and a measurement method for producing a sensor according to independent claims 1 and 15 respectively.

Further developments and advantageous configurations of the sensor are indicated in the dependent claims.

EXEMPLARY EMBODIMENTS

Various embodiments comprise a unit for determining the dominant light source type in electromagnetic radiation incident on the unit. The electromagnetic radiation is generated from a plurality of light sources of different types. The unit comprises at least one first photodetector designed to detect electromagnetic radiation in the visible spectral range and to generate a first output signal. The unit comprises at least one second photodetector designed to detect electromagnetic radiation in the infrared spectral range and to generate a second output signal. The unit comprises at least one calculation unit designed to derive a quotient result and a frequency result from the first and second output signals. The frequency result provides information about the presence or absence of signal components in a predetermined frequency range contained in the electromagnetic radiation. The unit comprises an evaluation unit designed to derive the dominant light source type from the quotient result and the frequency result.

Knowledge of the dominant light source type is helpful for reconstruction of the light spectrum and for optimum exposure in photography, in order correctly to reproduce the colour appearance. It allows IR light filtering to be dispensed with in a camera, for example. The colour representation of displays and projectors is corrected as a function of the dominant light source.

Both photodiodes are based on silicon diodes.

The first photodiode comprises a photopic filter, which means that the photodiode is adapted to the spectral sensitivity of the human eye. Such a photodiode is also known as an ambient light diode. This photodiode has its maximum sensitivity at a wavelength of approx. 550 nm and measures between approx. 400 nm and 700 nm. The sensitivity of the first photodiode is adjustable by the number and type of dielectric layers.

The second photodiode comprises an infrared filter. The photodiode has maximum sensitivity at a wavelength of approx. 860 nm and measures between approx. 800 nm and 900 nm. The sensitivity of the infrared sensor is adjusted either by the number and type of dielectric layers or by the use of a daylight filter.

In one preferred embodiment, the first and second photodiodes, the calculation unit and the evaluation unit are embodied by a single integrated circuit. This has the advantage that the sensor can be made as compact as possible.

In one preferred embodiment, the calculation unit comprises a first subunit, which is designed to derive the frequency result in such a way that it provides information about the presence or absence of components of the first output signal in a predetermined frequency range.

In one preferred embodiment, the first subunit comprises a first determination unit, which comprises a predefined electrical filter. The electrical filter is designed to make separable from one another the constant components of the first output signal by a low-pass filter, the frequency components of the first output signal at 50 Hz and/or 60 Hz by a bandpass filter and the frequency components of the first output signal in the kHz range by a high-pass filter. It is particularly advantageous to use an electrical filter, since this is simple and inexpensive to produce.

In an alternative preferred embodiment, the first subunit comprises a first determination unit, which is designed to integrate the first output signal.

In one preferred embodiment, the first determination unit is designed to carry out a plurality of integrations with different time constants. On the basis of the dependency of signal level on integration time, it is possible to identify the frequency with which the signal was modulated. The integrations may proceed simultaneously or in series.

In one preferred embodiment, the first determination unit is designed to perform a first integration with a first time constant in such a way that the frequency variable includes information about whether the first output signal comprises a spectral component of around 0 Hz.

In one preferred embodiment, the first determination unit is designed to perform a second integration with a second time constant in such a way that the frequency variable includes information about whether the first output signal comprises a spectral component at 50 or 60 Hz.

In one preferred embodiment, the first determination unit is designed to perform a third integration with a third time constant in such a way that the frequency variable includes information about whether the first output signal comprises a spectral component in the kHz range, in particular of around approximately 300 Hz.

In one preferred embodiment, the first subunit comprises a first comparison unit. The first comparison unit is designed to compare the frequency variable with at least one threshold value and to derive a frequency result therefrom.

In one preferred embodiment, the calculation unit comprises a second subunit with a second determination unit, which is designed to derive the quotient variable from a constant component of the first output signal and a constant component of the second output signal.

In one preferred embodiment, the second subunit comprises a second comparison unit, which is designed to compare the quotient variable with at least one threshold value and to derive a quotient result therefrom.

In one preferred embodiment, the evaluation unit is designed to read out an end value from a memory unit for every possible value of the frequency result and every possible value of the quotient result. The end value indicates the dominant light source type, which is derived from the value of the frequency result and of the quotient result.

In one preferred embodiment, the evaluation unit comprises a two-dimensional decision matrix, which contains assignments of frequency results and quotient results to the different light source types.

A measurement method is indicated for determining the dominant light source type in electromagnetic radiation incident on the unit and generated by a plurality of light sources. Electromagnetic radiation in the visible spectral range is detected and a first output signal is generated. Electromagnetic radiation in the infrared spectral range is detected and a second output signal is generated. Then a quotient result and a frequency result are determined from the first and second output signals, the frequency result providing information about the presence or absence of signal components in a predetermined frequency range contained in the electromagnetic radiation. Then the dominant light source type is derived from the quotient result and the frequency result.

BRIEF DESCRIPTION OF THE DRAWINGS

Various exemplary embodiments of the solution according to the invention are explained in greater detail below with reference to the drawings.

FIG. 5 shows a first matrix;
FIG. 6 shows a second matrix derived from the first matrix.

EXEMPLARY EMBODIMENTS OF THE OPTOELECTRONIC COMPONENT

Figure 1:
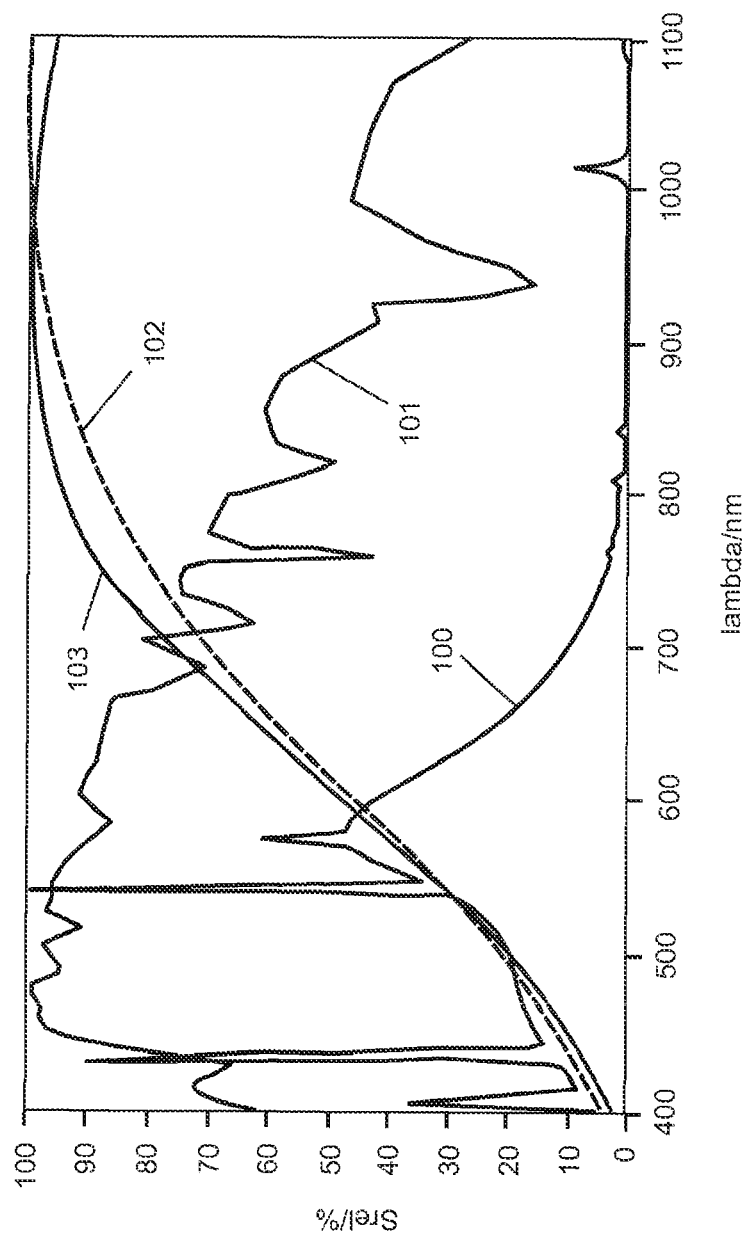
FIG. 1 shows the spectra of various light sources.

Identical, similar or identically acting elements are provided with the same reference numerals in the figures. The figures and the size ratios of the elements illustrated in the figures relative to one another are not to be regarded as being to scale. Rather, individual elements may be illustrated on an exaggeratedly large scale for greater ease of depiction and better comprehension.

FIG. 1 shows the spectra of various light sources. The spectrum of a fluorescent lamp 100 has a high intensity in the visible spectral range, i.e. between wavelengths of 390 nm and 780 nm. In the infrared spectral range, i.e. for wavelengths greater than 780 nm, the spectrum of a fluorescent lamp 100 has almost vanishingly small intensities. The spectrum of sunlight 101 has a high intensity in the visible spectral range and a lower intensity in the infrared spectral range. The spectrum of a thermal radiator 102 at a temperature of 2856 kelvin increases continuously to wavelengths of approx. 1000 nm. The spectrum of an incandescent lamp 103 extends substantially parallel to the spectrum of the thermal radiator 102.

Figure 2:
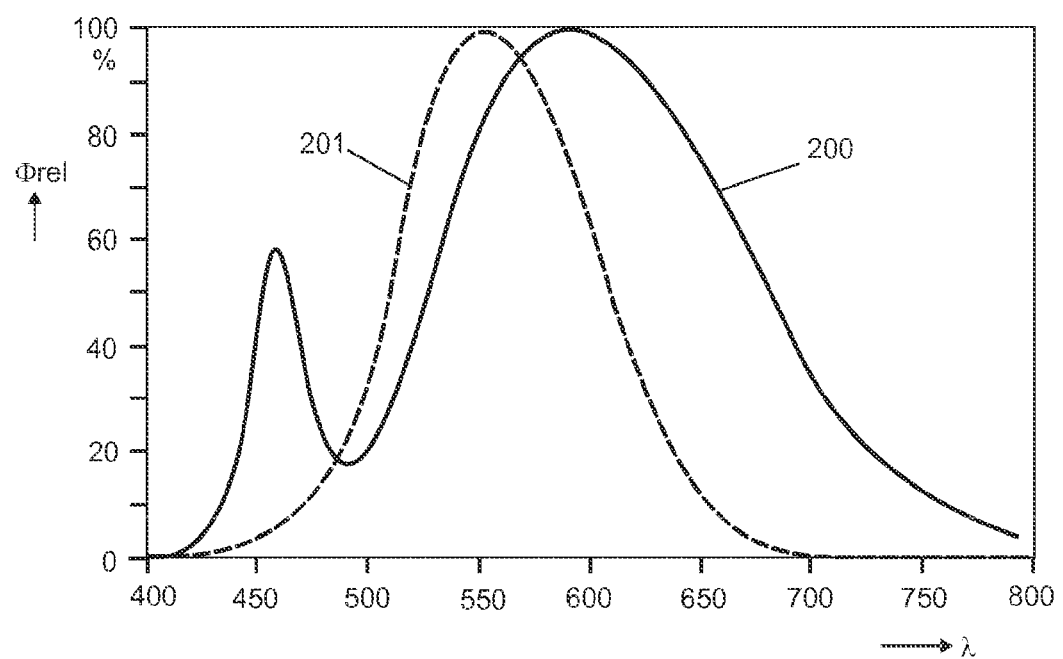
FIG. 2 shows a comparison of the spectrum of a white LED with the spectral sensitivity of the human eye.

FIG. 2 shows a comparison of the spectrum of a warm white emitting LED 200 with the curve 201 of the spectral sensitivity of the human eye. The primary maximum of the spectrum of the warm white emitting LED 200 is at a wavelength of approx. 590 nm; a secondary maximum is in the blue spectral range at a wavelength of 460 nm.

Figure 3:
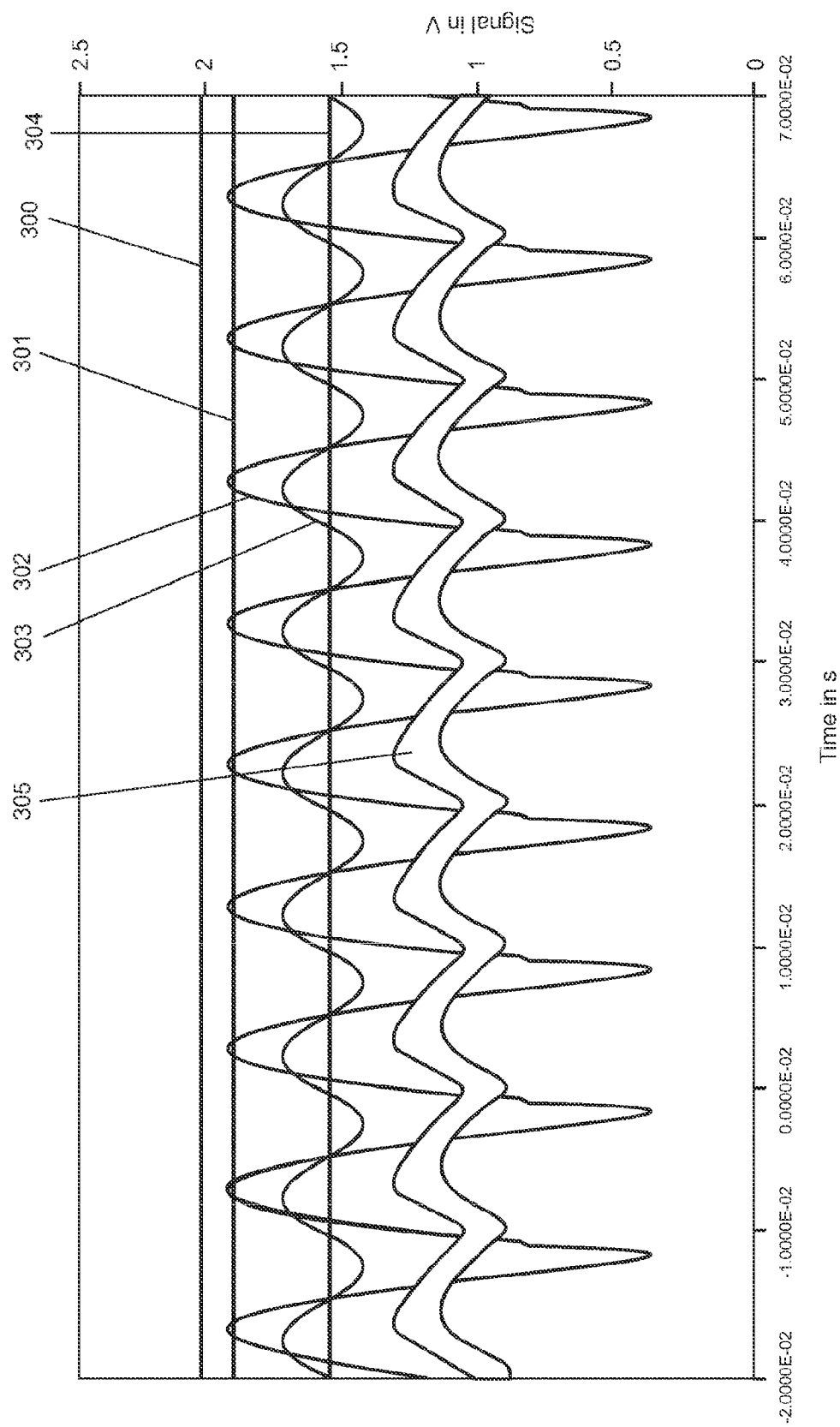
FIG. 3 shows the frequencies of various light sources.

FIG. 3 shows the frequencies of various light sources. The light from a torch 300, a direct current-operated LED 301 and an optical bench 304 is unmodulated, so the frequency is 0 Hz. The light from a fluorescent lamp 302, an incandescent lamp 303 and an energy-saving lamp 305 is modulated in each case with a frequency of 50 Hz.

Figure 4:
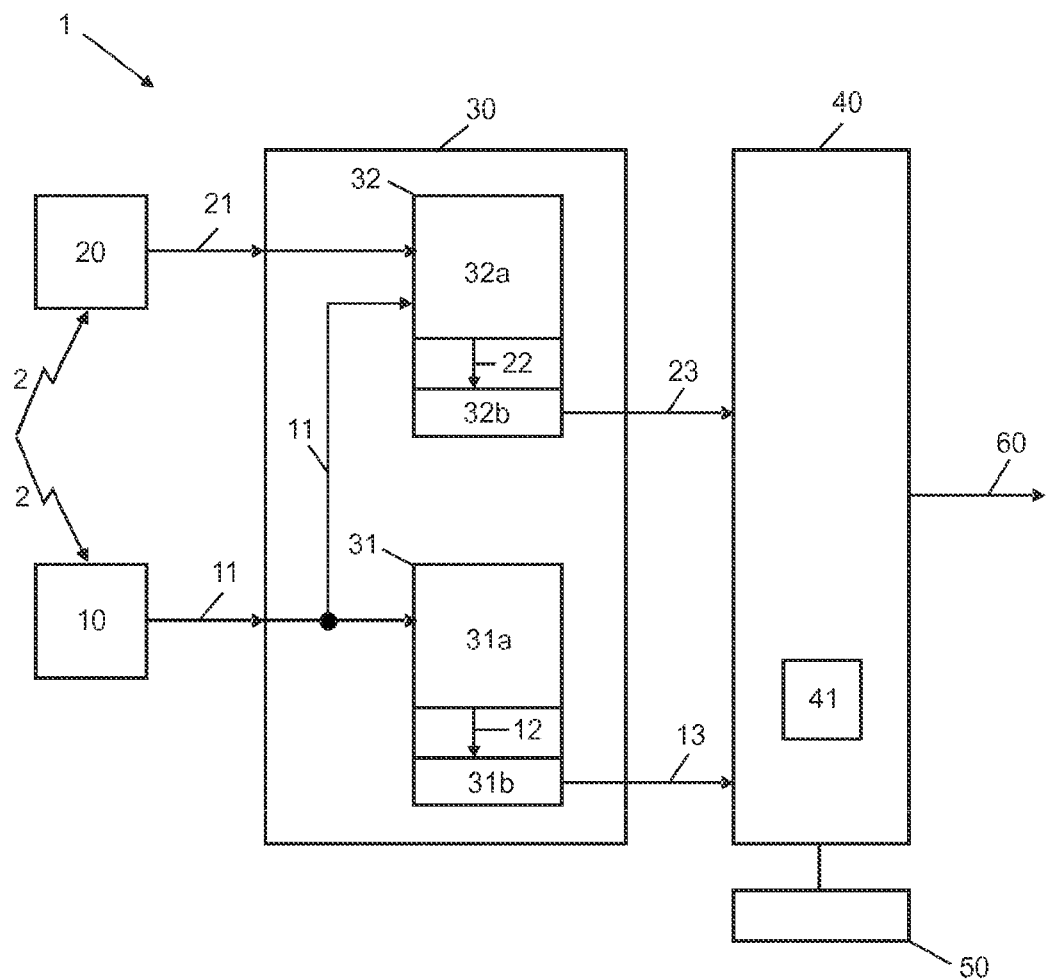
FIG. 4 shows a unit according to the invention.

FIG. 4 shows the unit 1 for determining the dominant light source type in electromagnetic radiation 2 incident on the unit 1 and generated from a plurality of light sources of different types. The unit comprises a first photodiode 10 designed to detect electromagnetic radiation in the visible spectral range and to generate a first output signal 11. The unit 1 additionally comprises a second photodiode 20 designed to detect electromagnetic radiation in the infrared spectral range and to generate a second output signal 21. The unit comprises a calculation unit 30 designed to derive a quotient result 23 and a frequency result 13 from the first 11 and second 21 output signals. The frequency result 13 supplies information about the presence or absence of signal components in a predetermined frequency range contained in the electromagnetic radiation. The unit 1 comprises an evaluation unit 40 designed to derive the dominant light source type from the quotient result 23 and the frequency result 13.

The first and second photodiodes, 10 and 20 respectively, the calculation unit 30 and the evaluation unit 40 are embodied by a single integrated circuit. The calculation unit 30 comprises a first subunit 31 designed to derive the frequency result 13 in such a way that it provides information about the presence or absence of components of the first output signal 11 in a predetermined frequency range. The first subunit 31 comprises a first determination unit 31a, which comprises a predefined electrical filter. The electrical filter is designed to make separable from one another the constant components of the first output signal 11 by a low-pass filter, the frequency components of the first output signal 11 at 50 Hz or 60 Hz by a bandpass filter and the frequency components of the first output signal 11 in the kHz range by a high-pass filter. Alternatively, the first subunit 31 comprises a first determination unit 31a designed to integrate the first output signal 11. The first determination unit 31a is designed to perform a plurality of integrations with different time constants. A first integration with a first time constant should be performed in such a way that the frequency variable 12 comprises information about whether the first output signal 11 has a spectral component of around 0 Hz. A second integration with a second time constant should be performed in such a way that the frequency variable 12 comprises information about whether the first output signal 11 has a spectral component at 50 or 60 Hz. A third integration with a third time constant should be performed in such a way that the frequency variable 12 comprises information about whether the first output signal 11 has a spectral component in the kHz range, in particular around approx. 300 kHz.

The first subunit 31 comprises a first comparison unit 31b designed to compare the frequency variable 12 with at least one threshold value and to derive a frequency result 13 therefrom.

The calculation unit 30 comprises a second subunit 32 with a second determination unit 32a. The determination unit 32a is designed to derive the quotient variable 22 from a constant component of the first output signal 11 and a constant component of the second output signal 21.

The second subunit 32 comprises a second comparison unit 32b designed to compare the quotient variable 22 with at least one threshold value and to derive a quotient result 23 therefrom.

The evaluation unit 40 is designed to read out an end value 60 from a memory unit 50 for every possible value of the frequency result 13 and every possible value of the quotient result 23. The end value 60 indicates the dominant light source type derived from the value of the frequency result 13 and of the quotient result 23.

The evaluation unit 40 comprises a decision matrix 41, which contains assignments of frequency results 13 and quotient results 23 to the various types of light source.

FIG. 5 shows for various light sources the values for the constant components of the first output signal 11 in the visible spectral range, for the constant components of the second output signal 21 in the infrared spectral range, for the ratio of constant components of the second output signal 21 to the constant components of the first output signal 11, here denoted quotient result, and for the frequency result.

FIG. 6 shows the two-dimensional decision matrix 41, which contains assignments of frequency results 13 and quotient results 23 to the various types of light source. The quotient result 23 is formed from the constant component of the second output signal 21 divided by the constant component of the first output signal 11. The quotient results 23 may be very low, low or high. The frequency results 13 may be in the kHz range, at 50 Hz or 60 Hz or at 0 Hz. The quotient result 23 for sunlight is low and its frequency result 13 is 0 Hz. The quotient result 23 for an incandescent lamp is high and its frequency result 13 is 50 or 60 Hz. The quotient result 23 for a torch is high and its frequency result 13 is 0 Hz. The quotient result 23 for a fluorescent lamp is very low and its frequency result 13 is 50 or 60 Hz. The quotient result 23 for a pulse-operated white LED is very low and its frequency result 13 is in the kHz range, in particular around 300 kHz. The quotient result 23 for a direct current-operated white LED is very low and its frequency result is 0 Hz.

The unit has been described with reference to a number of exemplary embodiments to illustrate the underlying concept. The exemplary embodiments are not restricted to specific combinations of features. Although some features and configurations have only been described in connection with a particular exemplary embodiment or individual exemplary embodiments, they may in each case be combined with other features from other exemplary embodiments. It is likewise feasible to omit individual described features or particular configurations from or add them to exemplary embodiments, provided the general technical teaching is still embodied Even if the steps of the measurement method of a sensor are described in a specific sequence, it goes without saying that each of the methods described in this disclosure can be performed in any other meaningful sequence, wherein method steps may also be omitted or added, provided this does not deviate from the basic concept of the described technical teaching.

LIST OF REFERENCE SIGNS

1 Unit/sensor
2 Incident electromagnetic radiation
10 First photodiode
11 First output signal
12 Frequency variable
13 Frequency result
20 Second photodiode
21 Second output signal
22 Quotient variable
23 Quotient result
30 Calculation unit
31 First subunit
31a First determination unit
31b First comparison unit
32 Second subunit
32a Second determination unit
32b Second comparison unit
40 Evaluation unit
41 Decision matrix
50 Memory unit
60 End value
100 Spectrum of a fluorescent lamp
101 Spectrum of sunlight
102 Spectrum of a thermal radiator at 2856K
103 Spectrum of an incandescent lamp
200 Spectrum of a white LED
201 Spectral sensitivity of the eye
300 Frequency of a torch
301 Frequency of an OSTAR LED
302 Frequency of a fluorescent tube
303 Frequency of an incandescent lamp
304 Frequency of an optical bench (tungsten lamp at constant power)
305 Frequency of an energy-saving lamp

The invention claimed is:

1. A unit for determining a dominant light source type in electromagnetic radiation incident on the unit and generated from a plurality of light sources of different types, comprising:
    at least one first photodiode designed to detect electromagnetic radiation in the visible spectral range and to generate a first output signal;
    at least one second photodiode designed to detect electromagnetic radiation in the infrared spectral range and to generate a second output signal;
    at least one calculation unit designed to derive a quotient result and a frequency result from the first and second output signals, the frequency result providing information about the presence or absence of signal components in a predetermined frequency range contained in the electromagnetic radiation; and
    at least one evaluation unit designed to derive the dominant light source type from the quotient result and the frequency result,
    wherein the calculation unit comprises a first determination unit designed to integrate the first output signal, and
    wherein the first determination unit is designed to perform a plurality of integrations with different time constants.

2. The unit according to claim 1, wherein the first and second sensors, the calculation unit and the evaluation unit are embodied by a single integrated circuit.

3. The unit according to claim 1, wherein the first subunit comprises a first comparison unit designed to compare the frequency variable with at least one threshold value and to derive the frequency result therefrom.

4. The unit according to claim 1, wherein the calculation unit comprises a second subunit with a second determination unit, which is designed to derive the quotient variable from a constant component of the first output signal and a constant component of the second output signal.

5. The unit according to claim 1, wherein the evaluation unit is designed to read out from a memory unit, for every possible value of the frequency result and every possible value of the quotient result, an end value indicating the dominant light source type.

6. The unit according to claim 1, wherein the evaluation unit comprises a two-dimensional decision matrix, which contains assignments of frequency results and quotient results to the different light source types.

7. The unit according to claim 1, wherein the first determination unit is designed to perform three integrations with three different time constants,
    wherein a first integration with a first time constant is performed in such a way for obtaining information about whether the first output signal has a spectral component of around 0 Hz,
    wherein a second integration with a second time constant is performed in such a way for obtaining information about whether the first output signal has a spectral component at 50 or 60 Hz, and
    wherein a third integration with a third time constant is performed in such a way for obtaining information about whether the first output signal has a spectral component in the kHz range.

8. The unit according to claim 4, wherein the second subunit comprises a second comparison unit designed to compare the quotient variable with at least one threshold value and to derive a quotient result therefrom.

9. A unit for determining a dominant light source type in electromagnetic radiation incident on the unit and generated from a plurality of light sources of different types, comprising:
at least one first photodiode designed to detect electromagnetic radiation in the visible spectral range and to generate a first output signal, wherein the first photodiode is formed as an ambient light diode, such that the first photodiode is adapted to the spectral sensitivity of the human eye;
at least one second photodiode designed to detect electromagnetic radiation in the infrared spectral range and to generate a second output signal;
at least one calculation unit designed to derive a quotient result and a frequency result from the first and second output signals, the frequency result providing information about the presence or absence of signal components in a predetermined frequency range contained in the electromagnetic radiation; and
at least one evaluation unit designed to derive the dominant light source type from the quotient result and the frequency result,
wherein the calculation unit comprises a first subunit having a first determination unit,
wherein the first determination unit is designed either to:
integrate the first output signal, or
comprises a predefined electrical filter designed to make separable from one another the constant components of the first output signal by a low-pass filter, the frequency components of the first output signal at 50 Hz or 60 Hz by a bandpass filter and the frequency components of the first output signal in the kHz range by a high-pass filter,
wherein the first subunit further comprises a first comparison unit designed to compare a frequency variable with at least one threshold value and to derive the frequency result therefrom,
wherein the calculation unit further comprises a second subunit having a second determination unit,
wherein the second determination unit is designed to derive a quotient variable from a constant component of the first output signal and a constant component of the second output signal, and
wherein the second subunit comprises a second comparison unit designed to compare the quotient variable with at least one threshold value and to derive the quotient result therefrom.

10. The unit according to claim 9, wherein the first photodiode has its maximum sensitivity at a wavelength of about 550 nm and measures electromagnetic radiation having a wavelength between 400 nm and 700 nm.

11. The unit according to claim 9, wherein the calculation unit comprises a first subunit designed to derive the frequency result in such a way that it provides information about the presence or absence of components of the first output signal in a predetermined frequency range.

12. The unit according to claim 11, wherein the first subunit comprises a first determination unit, which comprises a predefined electrical filter designed to make separable from one another the constant components of the first output signal by a low-pass filter, the frequency components of the first output signal at 50 Hz or 60 Hz by a bandpass filter and the frequency components of the first output signal in the kHz range by a high-pass filter.

13. The unit according to claim 11, wherein the first subunit comprises a first determination unit designed to integrate the first output signal.

14. The unit according to claim 11, wherein the first subunit comprises a first determination unit which is designed to identify a modulation frequency of the first output signal by performing a plurality of integrations with different time constants.

15. The unit according to claim 13, wherein the first determination unit is designed to perform a plurality of integrations with different time constants.

16. The unit according to claim 15, wherein the first determination unit is designed to perform a first integration with a first time constant in such a way that the frequency variable comprises information about whether the first output signal comprises a spectral component of around 0 Hz.

17. The unit according to claim 15, wherein the first determination unit is designed to perform a second integration with a second time constant in such a way that the frequency variable comprises information about whether the first output signal comprises a spectral component at 50 or 60 Hz.

18. The unit according to claim 15, wherein the first determination unit is designed to perform a third integration with a third time constant in such a way that the frequency variable comprises information about whether the first output signal comprises a spectral component in the kHz range.

19. A measurement method for determining, by a unit, the dominant light source type in electromagnetic radiation incident on the unit and generated from a plurality of light sources, the method comprising:
detecting electromagnetic radiation in the visible spectral range and generating a first output signal;
detecting electromagnetic radiation in the infrared spectral range and generating a second output signal;
deriving, by a calculation unit, a quotient result and a frequency result from the first and second output signals, the frequency result containing information about the presence or absence of signal components in a predetermined frequency range contained in the electromagnetic radiation; and
deriving the dominant light source type from the quotient result and from the frequency result,
wherein the calculation unit comprises a first determination unit designed to integrate the first output signal, and
wherein the first determination unit is designed to perform a plurality of integrations with different time constants.

20. The measurement method according to claim 19, wherein the first determination unit is designed to perform three integrations with three different time constants,
wherein a first integration with a first time constant is performed in such a way for obtaining information about whether the first output signal has a spectral component of around 0 Hz,
wherein a second integration with a second time constant is performed in such a way for obtaining information about whether the first output signal has a spectral component at 50 or 60 Hz, and
wherein a third integration with a third time constant is performed in such a way for obtaining information about whether the first output signal has a spectral component in the kHz range.

* * * * *